(12) United States Patent
Oessenich et al.

(10) Patent No.: US 9,217,463 B2
(45) Date of Patent: Dec. 22, 2015

(54) SHAFT OF A GAS-TURBINE ENGINE, IN PARTICULAR A RADIAL SHAFT OR A SHAFT ARRANGED AT AN ANGLE TO THE MACHINE AXIS

(71) Applicant: Rolls-Royce Deutschland Ltd & Co KG, Blankenfelde-Mahlow (DE)

(72) Inventors: Ruediger Oessenich, Rangsdorf (DE); Andreas Freund, Dresden (DE); Mirko Filler, Dresden (DE); Ole Renner, Dresden (DE); Alexander Pabst, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 14/076,834

(22) Filed: Nov. 11, 2013

(65) Prior Publication Data

US 2014/0141894 A1 May 22, 2014

(30) Foreign Application Priority Data

Nov. 13, 2012 (DE) .......................... 10 2012 022 198

(51) Int. Cl.

| F16C 3/00 | (2006.01) |
|---|---|
| F16C 3/02 | (2006.01) |
| F01D 5/06 | (2006.01) |
| F01D 5/28 | (2006.01) |

(52) U.S. Cl.
CPC . *F16C 3/026* (2013.01); *F01D 5/06* (2013.01); *F01D 5/282* (2013.01); *F05D 2240/61* (2013.01); *F05D 2300/603* (2013.01); *F05D 2300/614* (2013.01); *F16C 2360/23* (2013.01); *Y02T 50/672* (2013.01); *Y02T 50/673* (2013.01)

(58) Field of Classification Search
CPC ........... F01D 5/06; F01D 5/282; F16C 3/026; F16C 2360/23; F05D 2240/61; F05D 2300/603; F05D 2300/614; Y02T 50/672; Y02T 50/673
USPC .................................. 464/181, 183; 156/187
See application file for complete search history.

(56) References Cited

U.S. PATENT DOCUMENTS 4,238,540 A * 12/1980 Yates et al. ................. 464/181 X (Continued)

FOREIGN PATENT DOCUMENTS

| CA | 2131386 | 11/1993 |
|---|---|---|
| DE | 4107222 | 4/1992 |

(Continued)

OTHER PUBLICATIONS

German Search Report dated Jul. 8, 2013 from counterpart German Patent Application DE102012022198.3.

*Primary Examiner* — Gregory Binda
(74) *Attorney, Agent, or Firm* — Timothy J. Klima; Shuttleworth & Ingersoll, PLC

(57) ABSTRACT

A radial shaft of a gas-turbine engine which is made up of +/−45° layers, zero layers and +/−30° layers of carbon fiber composite and connected to load-input end pieces via sinusoidal connecting areas.

9 Claims, 16 Drawing Sheets

(56) References Cited

U.S. PATENT DOCUMENTS

| | | | |
|---|---|---|---|
| 4,248,062 A * | 2/1981 | McLain et al. | 464/181 |
| 4,451,245 A * | 5/1984 | Hornig et al. | 464/181 |
| 4,605,385 A * | 8/1986 | Puck et al. | 464/181 |
| 5,851,152 A | 12/1998 | Ilzhofer et al. | |
| 8,246,478 B2 | 8/2012 | Schreiber et al. | |
| 8,251,830 B2 | 8/2012 | Schreiber et al. | |
| 8,529,361 B2 | 9/2013 | Hechler-Stabbert et al. | |
| 2011/0038666 A1 | 2/2011 | Schreiber | |
| 2014/0130964 A1* | 5/2014 | Beyer et al. | |

FOREIGN PATENT DOCUMENTS

| | | | |
|---|---|---|---|
| DE | 69304689 | 4/1997 | |
| DE | 19613857 | 10/1997 | |
| DE | 102008056002 | 5/2010 | |
| DE | 102008056018 | 5/2010 | |
| DE | 102009037049 | 2/2011 | |
| DE | 102010048926 | 4/2012 | |
| GB | 1599292 | 9/1981 | |
| GB | 2233425 | 1/1991 | |
| JP | 4-347006 A * | 12/1992 | 464/181 |

* cited by examiner

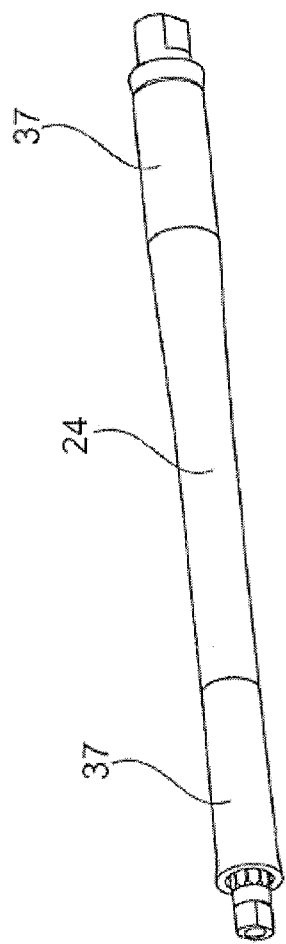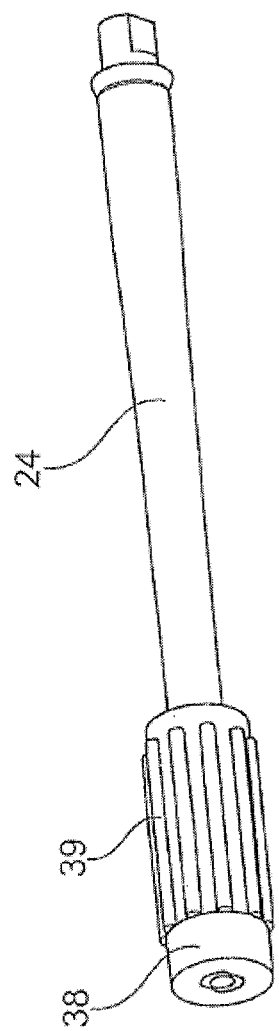

SHAFT OF A GAS-TURBINE ENGINE, IN PARTICULAR A RADIAL SHAFT OR A SHAFT ARRANGED AT AN ANGLE TO THE MACHINE AXIS

This application claims priority to German Patent Application 102012022198.3 filed Nov. 13, 2012, the entirety of which is incorporated by reference herein.

BACKGROUND

This invention relates to a shaft of a gas-turbine engine, in particular a radial shaft or a shaft arranged at an angle to the machine axis.

Radial shafts for gas-turbine engines are mostly made of metal. They are used to start the engine, where an electric motor or an air turbine installed in an external gearbox drives the radial shaft via a gear unit. This shaft is connected via a gear unit to the high-pressure compressor of the gas turbine. For starting, the high-pressure compressor is thus put into rotation in order to start the combustion process.

During operation of the engine, the shaft is driven via the same connection in the reverse direction, in order to drive pumps and generators using an external gear unit.

Shafts of this type are subject to the following requirements: firstly the shaft has to be constructed very slender, since it must be passed through a strut in the intermediate casing or as a general principle through the second air circuit in the case of a dual-circuit/dual-flow turbine jet engine, and hence always represents a fluid-mechanical resistance which directly affects engine output and efficiency. With regard to its geometric configuration, the shaft must be passed through openings in the engine suspension in order to connect the external gear unit to the high-pressure compressor. A further requirement is that the shaft must transmit high torques at high speeds in both directions.

Radial shafts made of metal, as known from the state of the art, come up against the limits of their usability for engine design, as these shafts are already designed to the limit of the bending-critical speed. The materials used do therefore not permit any lengthening or slimming down of the shaft geometry, which considerably hampers the development of gas-turbine engines having a smaller core engine with higher speeds and a larger fan diameter. With a larger fan and a smaller diameter of the core engine, the result is a greater distance between the core engine and an external gear unit (gearbox), which would inevitably result in longer radial shafts. They would, in the metal construction method known from the state of the art, have to be designed with thicker walls, be of larger size and, due to the problem of bending, have a centric bearing as a support. This would lead to a higher weight of the overall engine plus poorer aerodynamics.

Already known from the state of the art are engine shafts for gas-turbine engines, which are constructed from fiber layers embedded in a high-temperature resistant plastic matrix. An example of this type is shown by DE 10 2008 056 018 A1. Such shafts have a large diameter and can have other dimensions, so that the application of this knowledge to radial shafts is not possible. Furthermore, in these engine shafts power transmission elements are in use which have a design unsuitable for radial shafts. Examples of this are shown by DE 10 2009 037 049 A1, GB 1 599 292 A and DE 41 07 222 C2.

SUMMARY AND DESCRIPTION OF THE INVENTION

The object underlying the present invention is to provide a shaft of an aircraft gas-turbine engine, in particular a radial shaft which, while being simply designed and easily and cost-effectively applicable, avoids the disadvantages of the state of the art and meets all requirements.

In accordance with the invention, a radial shaft is thus provided which is designed and manufactured in a fiber-composite design. Metallic end pieces are here connected to a tubular intermediate part of the shaft, causing a reduction in the overall weight of the radial shaft. The use of highly rigid fibers results in a very steep increase in stiffness. Due to the resultant higher bending-critical speed, it is not necessary to support the shaft by an additional centric bearing. Due to the high stiffnesses and high strengths of the fiber materials, it is possible to provide very long shaft structures, which can bridge the distance between a core engine and an external gearbox, while not necessitating any increase in the shaft diameter. The shaft in accordance with the invention is also characterized in that high torques can be transmitted and that a considerable increase in the natural frequency is achieved.

The radial shaft in accordance with the invention can therefore be designed to rotate very fast, so that speeds of up to 30,000 rpm can be achieved. Furthermore, the radial shaft in accordance with the invention is able to transmit high torques, for example up to 2,000 Nm. The diameters of such radial shafts can be very low, for example up to a maximum of 150 mm, in conjunction with very low wall thicknesses of approx. 3 mm, considerably reducing the overall weight.

The shaft in accordance with the invention can be manufactured preferably by means of the manufacturing method hereinafter described, with the following manufacturing steps being provided:

provision of a conical, rod-shaped metal core with end areas at both sides, where the end areas each have around their circumference a sinusoidal structure with convex and concave areas extending in the longitudinal direction of the respective end area, placing of structured rods (round rods) into the concave areas of the sinusoidal structure. This results in an approximately round structure of the core, where the necessary oversizes used for pressing the deposited carbon fibers into the sinusoidal valleys are created after the removal of the round rods, wrapping the core and the end areas with flat and splayed carbon fiber strips in a direction of ±45° to the longitudinal axis of the core by applying the carbon fibers, removal of the structured rods, radial pressing of the carbon fiber layers into the concave zones of the end areas of the core formed after removal of the structured rods, placing of filler rods of carbon fiber material into the concave zones of the end areas of the carbon fiber layers formed by pressing, in order to fill up the structure. Similar resin and fiber materials are used here for manufacturing the filler rods, the latter being made using the compression method, arranging highly rigid carbon fibers in the 0° direction (shaft longitudinal direction), wrapping the carbon fiber layers and the end areas provided with the filler rods with carbon fiber strips inclined at +/−88° to the longitudinal axis, placing the wrapped core into a multi-part resin injection mould, injection of resin into the resin injection mould, and heating and curing of the resin, removal of the core, cutting to length of the end areas of the tubular center part of the radial shaft thus formed, insertion of a metallic load-input end piece into each end area of the tubular center part, and joining the load-input end piece to the tubular center part.

In a preferred embodiment, it is provided that the metallic load-input end piece is joined by resin infiltration into the intermediate space between the load-input end piece and the end area of the tubular center part. This results in a positive connection, not however in a cohesive connection, and in particular not in a bonded one. The connection is achieved by friction between the resin placed into the space between the tubular center part and the load-input end piece. This space is for example 0.01 mm to 0.1 mm thick. The load-input end piece is therefore again detachable from the tubular center part.

In a favourable embodiment, it is also provided that the jacket is made of layers of splayed carbon fiber strips arranged parallel to one another by winding the layers around a polygonal core element, dividing the layers into individual sections and fixing the individual sections, plus subsequent folding of the center area of the layers made from carbon fiber strips inclined by +/−30°, in order to form the jacket.

The center area of the structure made up of layers of carbon fiber strips inclined by +/−45° is, in a favourable development of the invention, wrapped with at least one layer of carbon fiber strips arranged along the longitudinal axis.

BRIEF DESCRIPTION OF THE DRAWINGS

The present invention is described in the following in light of the accompanying drawing, showing exemplary embodiments. In the drawing, FIG. 13 shows a view, by analogy with FIG. 12, of a further process step, FIG. 14 shows a view of the process step of compressing the end areas of the +/−45° layers.

FURTHER DESCRIPTION OF THE INVENTION

Figure 1:
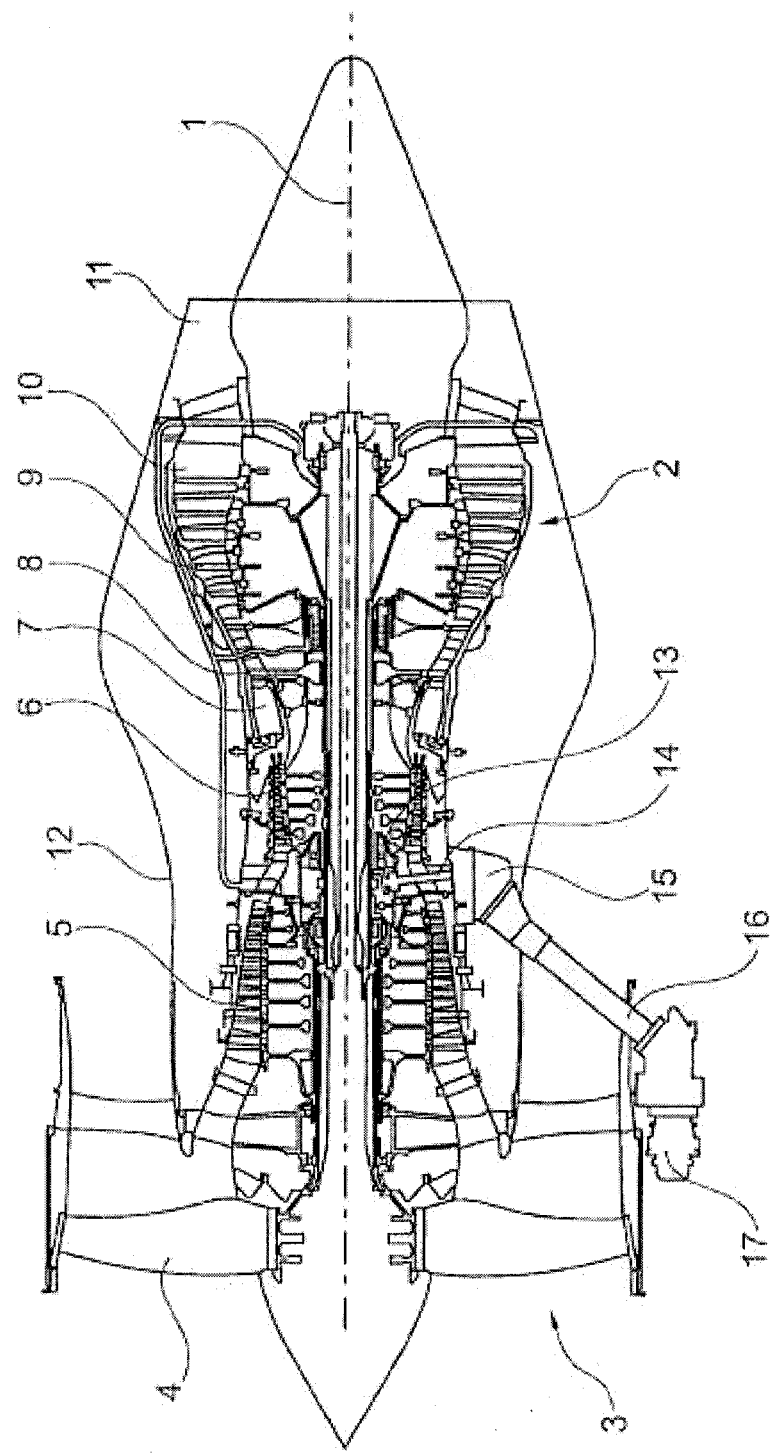
FIG. 1 shows a schematic representation of a gas-turbine engine in accordance with the present invention.

The gas-turbine engine 2 in accordance with FIG. 1 is a generally represented example where the invention can be used. The engine 2 is of conventional design and includes in the flow direction, one behind the other, an air inlet 3, a fan 4 rotating inside a casing, an intermediate-pressure compressor 5, a high-pressure compressor 6, a combustion chamber 7, a high-pressure turbine 8, an intermediate-pressure turbine 9 and a low-pressure turbine 10 as well as an exhaust nozzle 11, all of which being arranged about a center engine axis.

Figure 2:
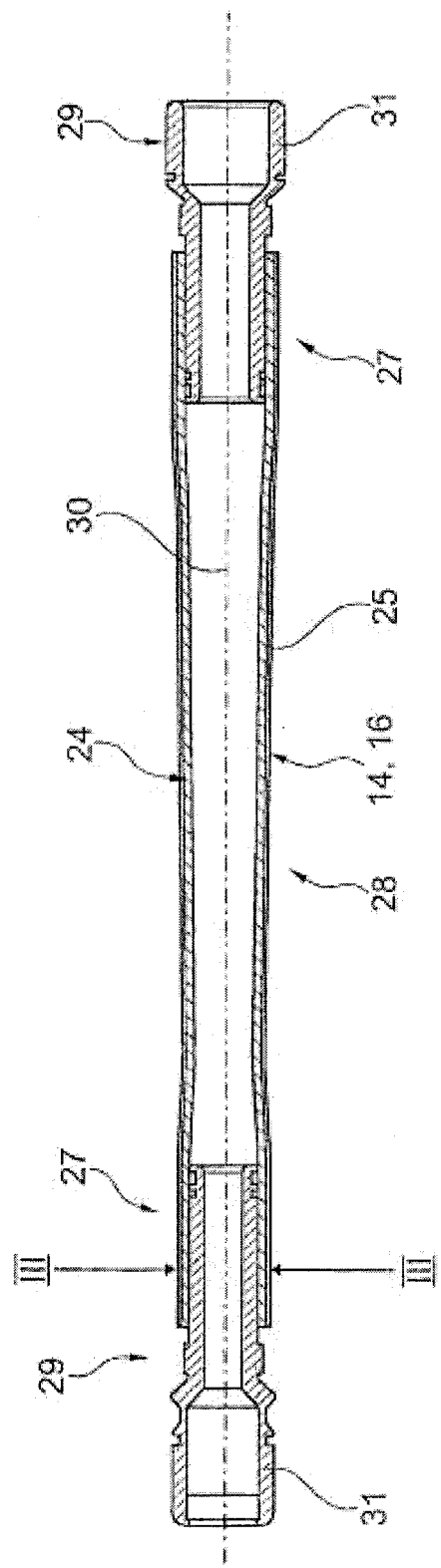
FIG. 2 shows a simplified longitudinal sectional view of an exemplary embodiment of the shaft in accordance with the invention.
Figure 3:
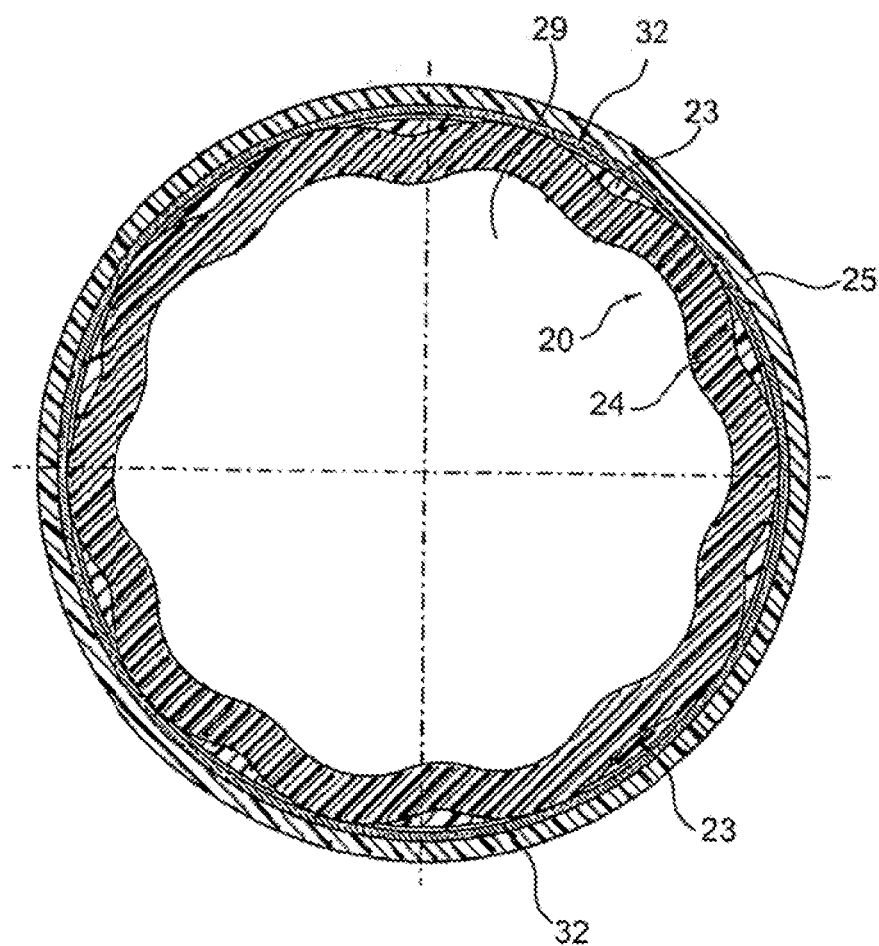
FIG. 3 shows a sectional view along the line III-III of FIG. 2.
Figure 4:
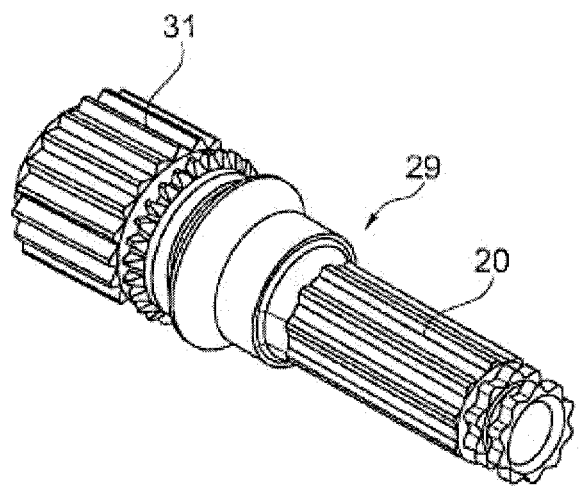
FIG. 4 shows a perspective view of an exemplary embodiment of the load-input end piece in accordance with the invention.
Figure 5:
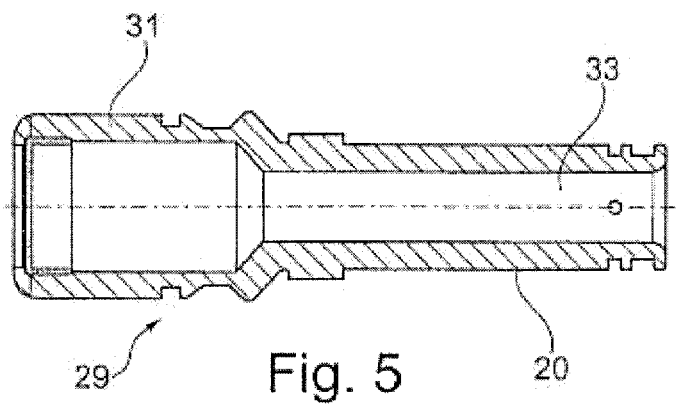
FIG. 5 shows a sectional view of an exemplary embodiment of the load-input end piece in accordance with the invention.
Figures 6, 7:
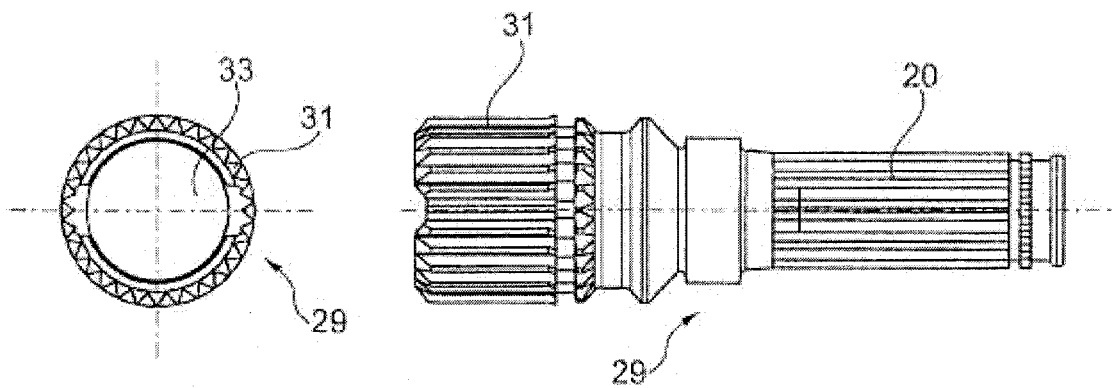
FIG. 6 shows a side view of an exemplary embodiment of the load-input end piece in accordance with the invention.
FIG. 7 shows an end view of an exemplary embodiment of the load-input end piece in accordance with the invention.
Figure 9:
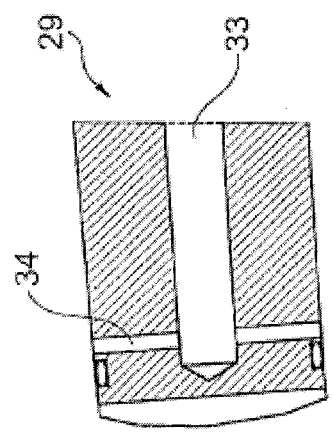
FIG. 9 shows an enlarged sectional view of an end portion of an exemplary embodiment of the load-input end piece in accordance with the invention.
Figure 8:
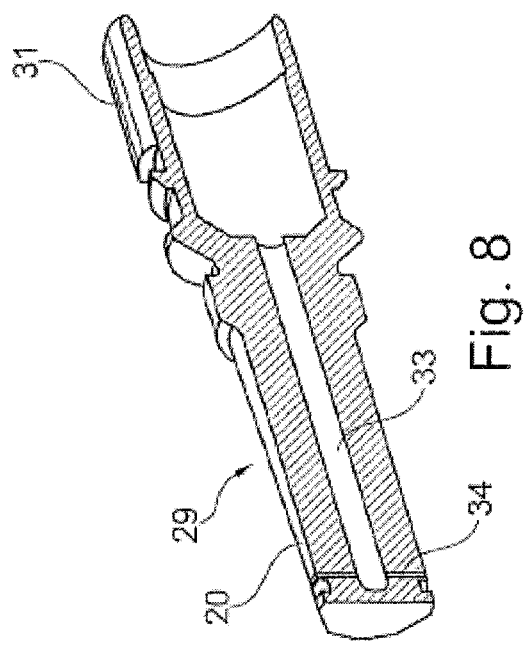
FIG. 8 shows a sectional perspective view of an exemplary embodiment of the load-input end piece in accordance with the invention.

FIGS. 2 and 3 show an exemplary embodiment of the radial shaft in accordance with the invention, or of an engine shaft of the inventive type. The shaft is designed either as a radial shaft 14 or as a shaft 16 arranged at an angle and is used to connect a gear unit 13 (see FIG. 1) to a gear unit 15. The gear unit 15 can be operatively connected to auxiliary units. The shaft designed in accordance with the invention can also be designed in the form of a shaft 16 arranged inclined (see FIG. 1) and connected to a gear unit 17 for the connection of auxiliary units.

The following description relates to the radial shaft 14, the shaft 16 arranged at an angle in accordance with the invention being designed analogously.

Figure 24:
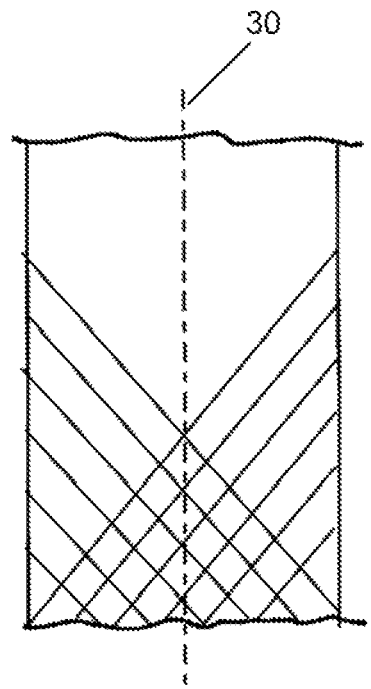

The shaft 14 includes an inside arrangement of layers 24 which is made up of carbon fibers positioned at +/−45° to the center axis 30 of the shaft. See FIG. 24 (not necessarily to scale). The layers 24 thus form a part of a tubular center part 28 of the shaft 14 in accordance with the invention. The shaft 14 is connected to two load-input end pieces 29, as will be described in the following. The load-input end pieces 29 are each provided at their free end areas with a toothing 31, which can for example be designed as a serration. This is shown in particular in FIGS. 4 to 10.

Figure 25:
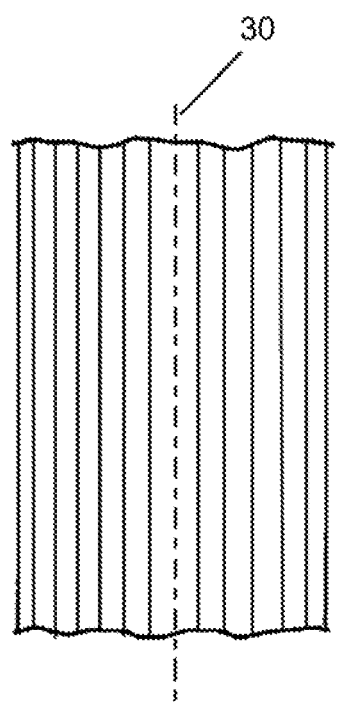

FIGS. 2 and 3 show furthermore that on the layers 24 of the tubular center part 28 further layers 25 are provided, which are formed from carbon fibers at a position of +/−30° to the center axis 30. The layers 24 form an intermediate structure for torsion transmission. Layers 32 are arranged on the layers 24 and include high-modulus carbon fibers arranged parallel to the center axis 30 of the shaft and hence at 0° to the center axis 30, contributing to increasing the stiffness. The layers 25 are used for compacting of the composite and for fixing of the zero layers 32. See FIG. 25.

The end areas 27 of the shafts 14 and 16, respectively, have a sinusoidal inner contour, as can be seen from FIG. 3. A load-input end piece 29 is inserted into this sinusoidal inner contour and has a matching sinusoidal outer contour, as can be seen in FIG. 3. The result is therefore a positive connection. As will be described in the following, the layers 24 are sinusoidal both at their inner contour and at their outer contour. To fill the concave interspaces, filler rods 23 made of carbon fiber-reinforced resin are arranged, on which rods the arrangement of the zero layers 32 is located, which has a cylindrical outer contour.

Figure 10:
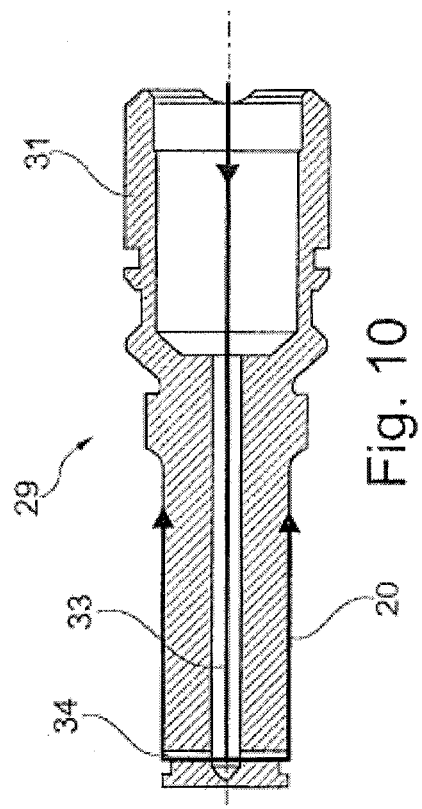
FIG. 10 shows a sectional view of an exemplary embodiment of the load-input end piece in accordance with the invention.

FIGS. 4 to 10 show the load-input end pieces 29 provided in accordance with the invention in differing illustrations of modified exemplary embodiments. These end pieces 29 each have a centric recess 33, which at the end area merges into radial ducts 34. It is thus possible, during pressing of resin as part of the joining process (see description of FIG. 19), to press out resin, as shown in FIG. 10, through the centric recess 33 and the radial ducts 34, in order to fill resin into the intermediate space between the outer contour of the load-input end piece 29 and the end area 27 of the shaft 14. This results in a precisely fitting positive connection.

The radial shaft 14 in accordance with the invention thus consists of a fiber composite with two load-input elements 29 and a tubular center part 28. The connection between the fiber composite of the center part 28 and the load-input end pieces 29 is thus achieved using the sinusoidal contour, which permits a transmission of high torques at relatively small diameters. The contour is similar to the course of a sine function which follows the diameter continuously. This sinusoidal shape is provided on the inside of the fiber composite part. As described in the following, this design of the end area 27 forms an important aspect of the present invention. The fiber composite part of the shaft 14 has a rotationally symmetrical design, which includes from the inside to the outside the already mentioned layers 24 with +/−45° alignment, a zero layer 32 and layers 25 with +/−30° alignment.

Figure 11:
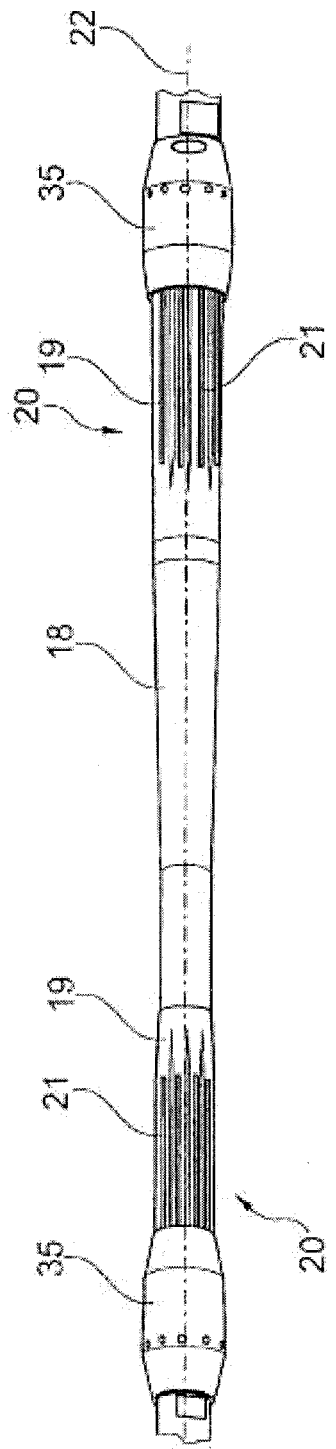
FIG. 11 shows a perspective view of a core with sinusoidal structure of its end areas and structured rods.
Figure 12:
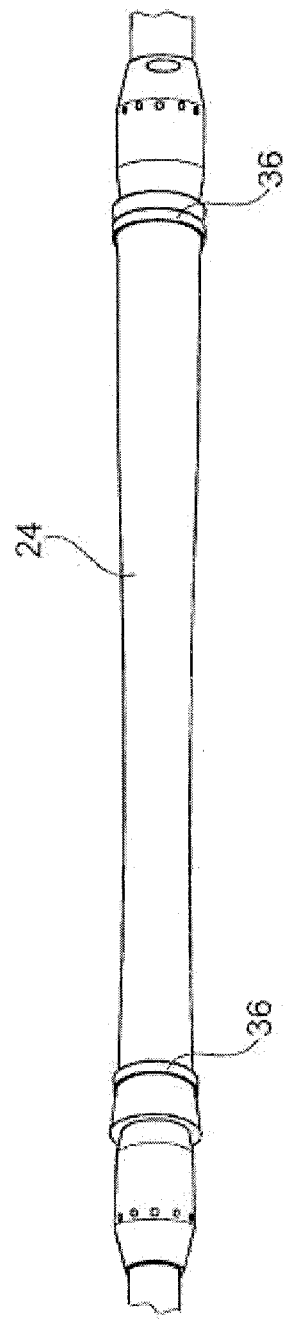
FIG. 12 shows a view of a subsequent manufacturing process, where the core 18 is wrapped with +/−45° layers of fiber strips.

In the following, a preferred manufacturing method is described in detail. FIG. 11 shows a preferably multi-part core 18. The latter is designed conical, since the shaft 14 too has a slightly conical structure. The core 18 is provided with end areas 19, which have a sinusoidal structure 20. Structured rods 21 are inserted into the concave areas and are held by means of a positioning aid 35. This state is shown in FIG. 11. Subsequently, +/−45° layers are applied using a conventional winding method. Here, the fibers are applied in dry condition, consist of splayed carbon fiber strips and are therefore flat so that crossover points between +/−45° arrangements are easily obtained. The layers 24 are applied completely over the end areas 19, as is shown in FIG. 12. The end areas of the layers 24 are fixed using cable ties 36 (see FIG. 12).

Figure 15:
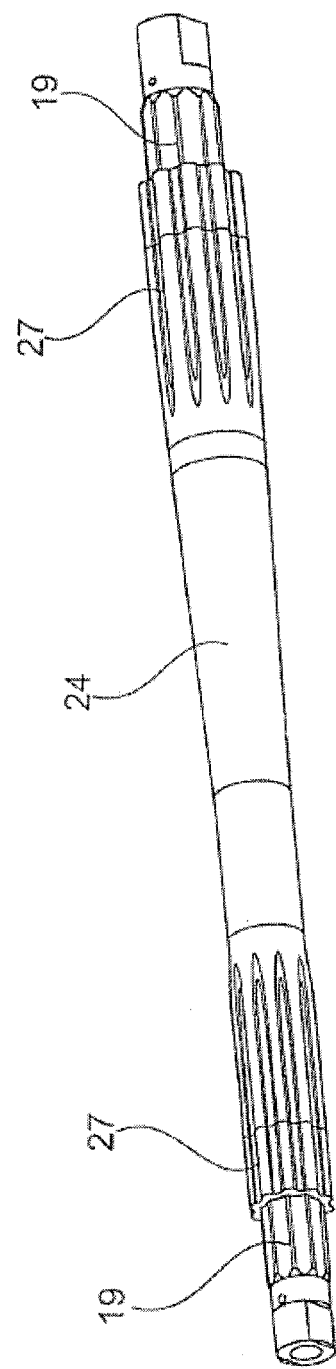
FIG. 15 shows a view of the completion process after pressing as per FIG. 14.

As shown in FIG. 13, the end areas 37 are tied in order to hold the layers of the carbon fiber material after the positioning aids 35 have been removed. This is followed by compressing of the end areas of the layers 24 by means of a pressing tool 38, which has radial slots inside which pressing elements 39 are radially moveable. The layers 24 are thus pressed into the concave zones of the end areas 19 of the core 18 (FIG. 14). The resultant intermediate step is shown in FIG. 15. It can be seen that the layers 24 follow the sinusoidal contour 19 of the core 18, as shown as the end result in FIG. 3.

Figure 16:
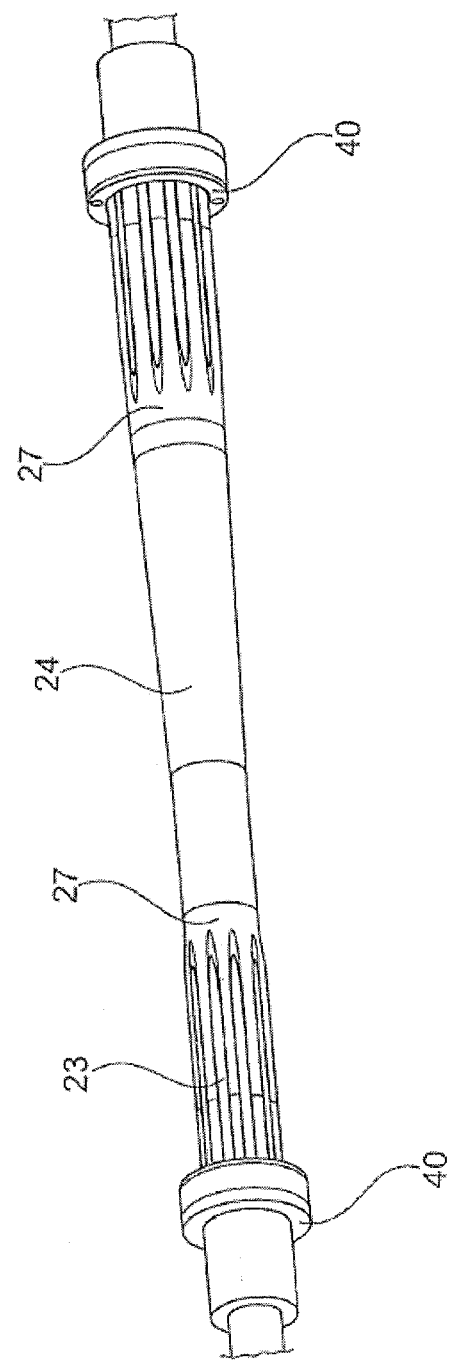
FIG. 16 shows a view, by analogy with FIG. 15, of the subsequent process step after the insertion of the filler rods.

Subsequently, filler rods 23 are inserted, as shown in FIG. 16, for filling the concave zones of the outer contour of the end areas 27 of the layers 24. The filler rods 23 are held by a positioning aid 40.

Figure 17:
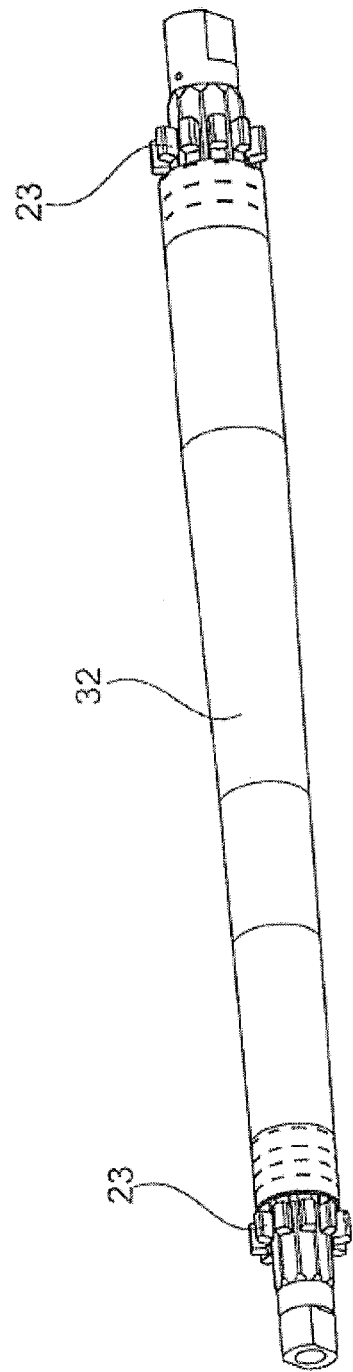
FIG. 17 shows a view of the process step following FIG. 16 after jacketing of the structure shown in FIG. 16.

The filler rods 23 are designed as contoured and flat rods, as can be inferred from FIG. 3. They therefore completely fill the concave zones of the sinusoidal structure, so that a cylindrical outer contour results. Onto this outer contour, zero layers 32 in the form of a mat or wound strips are applied as shown in FIG. 17. The zero layers are manufactured using additional tools. In particular, a cuboid-shaped winding core having a corner radius is used here. The highly rigid fibers are placed onto the cuboid-shaped winding core, then cut and removed, and applied in accordance with FIG. 17.

Figure 26:
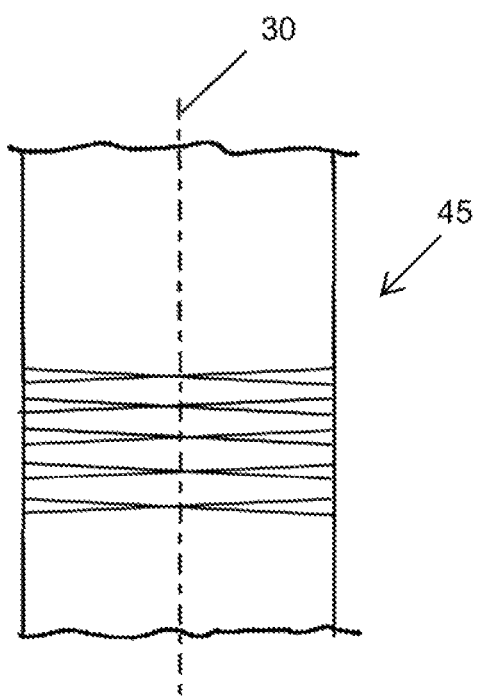

It can be provided here that at least one layer 45 of carbon fiber strips arranged at +/−88° is positioned at least radially adjoining the load-input end pieces 29, in particular instead of the zero layers 32. See FIG. 26 (not necessarily to scale).

Figure 18:
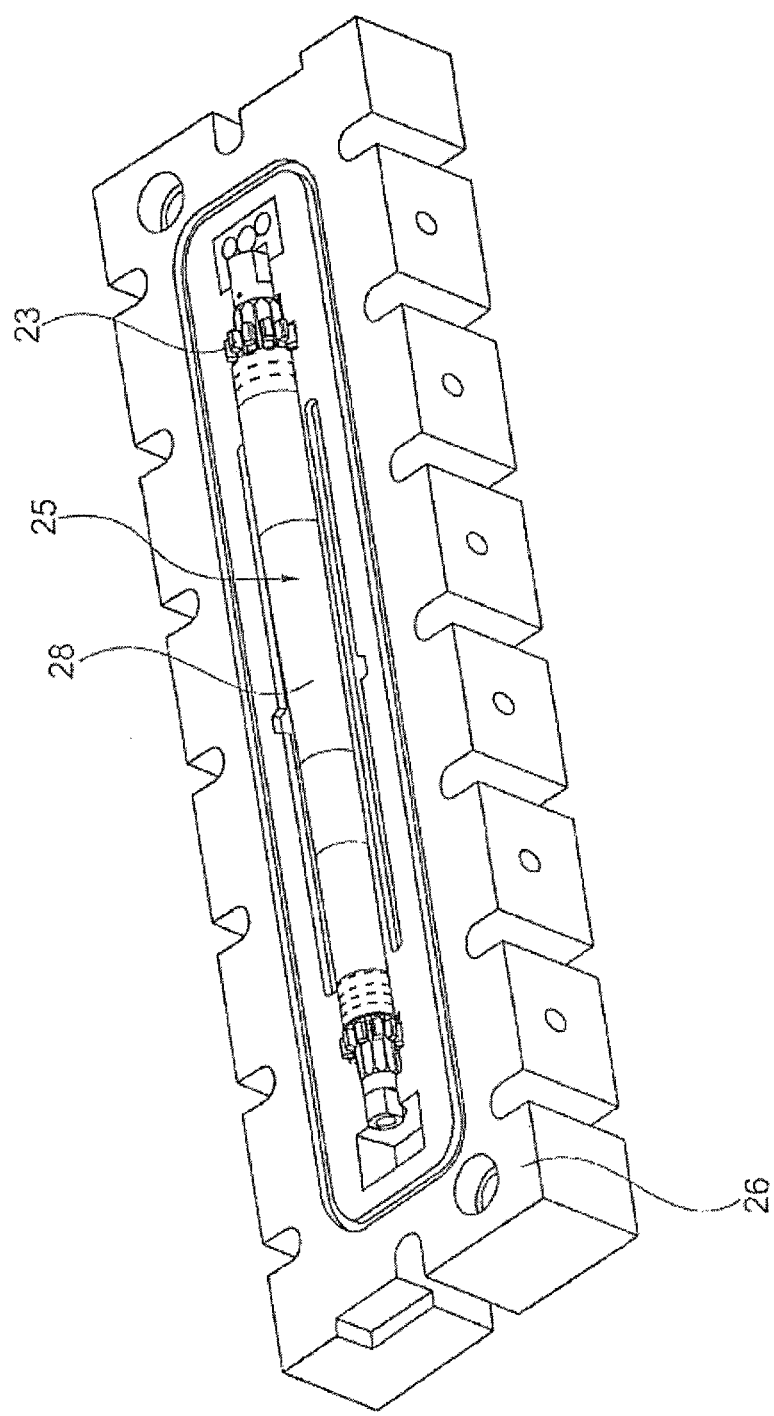
FIG. 18 shows a perspective partial view of a resin injection mould.

The structure thus manufactured has +/−30° layers 25 applied to it, as shown by the representation of FIG. 18. Then the entire arrangement is placed into a multi-part resin injection mould 26 and infiltrated with resin. The resin is thus pressed under pressure into the dry fiber pre-mould, i.e. into the layers 24, 32 and 25. This is a high-temperature resin system which quickly cross-links once the arrangement has been heated to a suitable temperature. For example, the resin quantity is heated within 5 minutes to 140° C., with the resin being injected within 3 minutes into the tool in order to completely cross-link the layers 24, 32 and 25.

Figure 19:
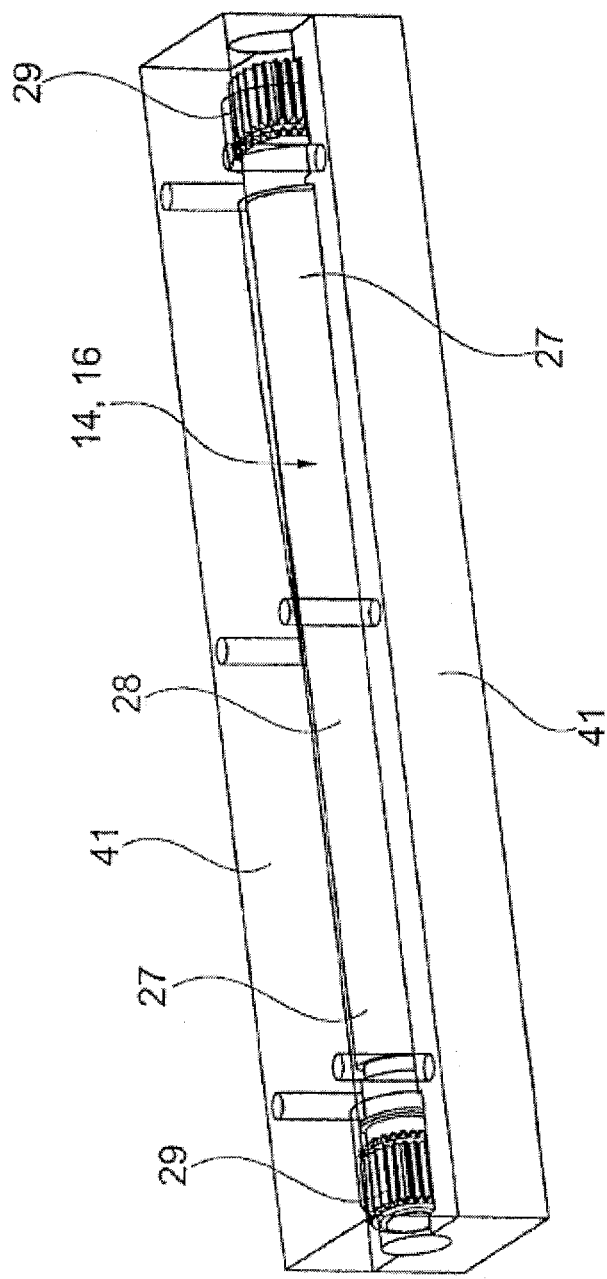
FIG. 19 shows a perspective view of a joining device for joining the load-input end pieces to the tubular center part of the shaft.

Subsequently, the individual parts of the core 18 or its end areas 19 are taken out and the projecting areas of the filler rods 23 are removed. The sinusoidal end areas of the load-input end pieces 29 are now inserted into the tubular center part 28 of the shaft 14. The length of the sinusoidal areas is for example between 50 and 70 mm. To join the load-input end pieces 29 to the tubular center part 28, they are inserted, as shown in FIG. 19, into a joining device 41 which is designed in several parts. Subsequently, resin is injected from the frontside, as is shown schematically in FIG. 10. This completes the radial shaft 14.

Figure 22:
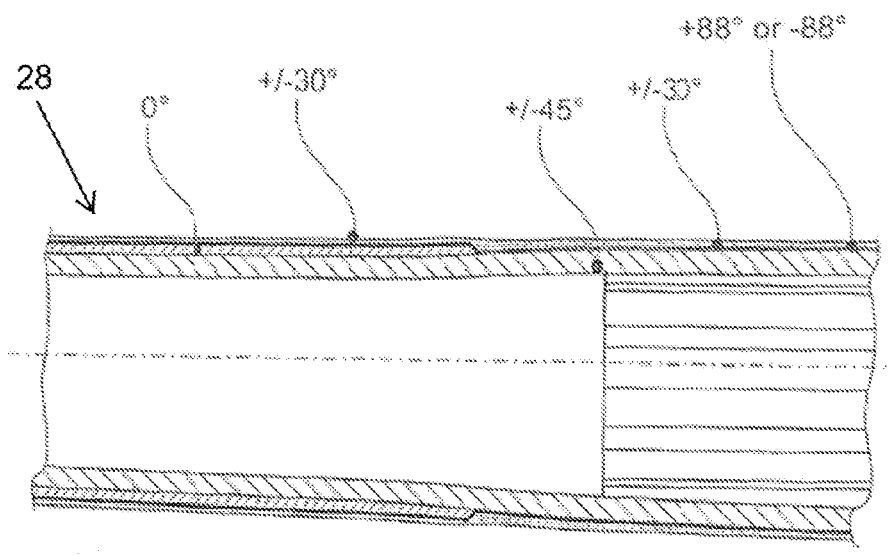
FIG. 22 shows a sectional longitudinal view, illustrating the respective layers of carbon fibers.
Figure 20:
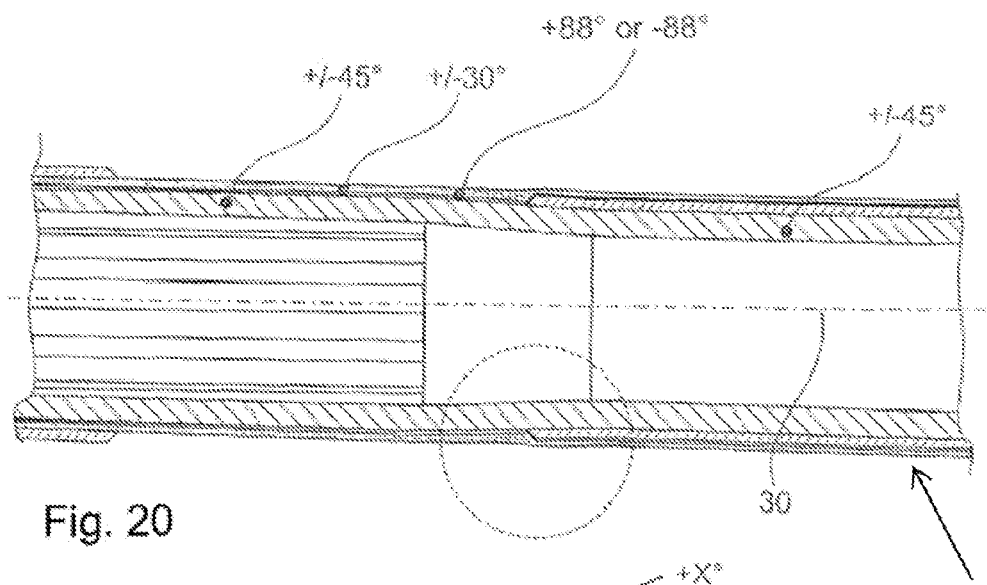
FIG. 20 shows a sectional longitudinal view, illustrating the respective layers of carbon fibers.
Figure 23:
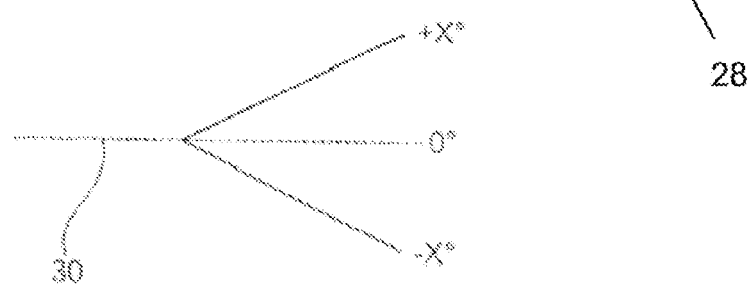
FIG. 23 shows the notation of orientation of fibers as shown in FIGS. 20-22, FIG. 24 schematically show a +/−45° orientation of fibers, FIG. 25 schematically shows a zero orientation of fibers, and FIG. 26 schematically shows a +/−88° orientation of fibers.
Figure 21:
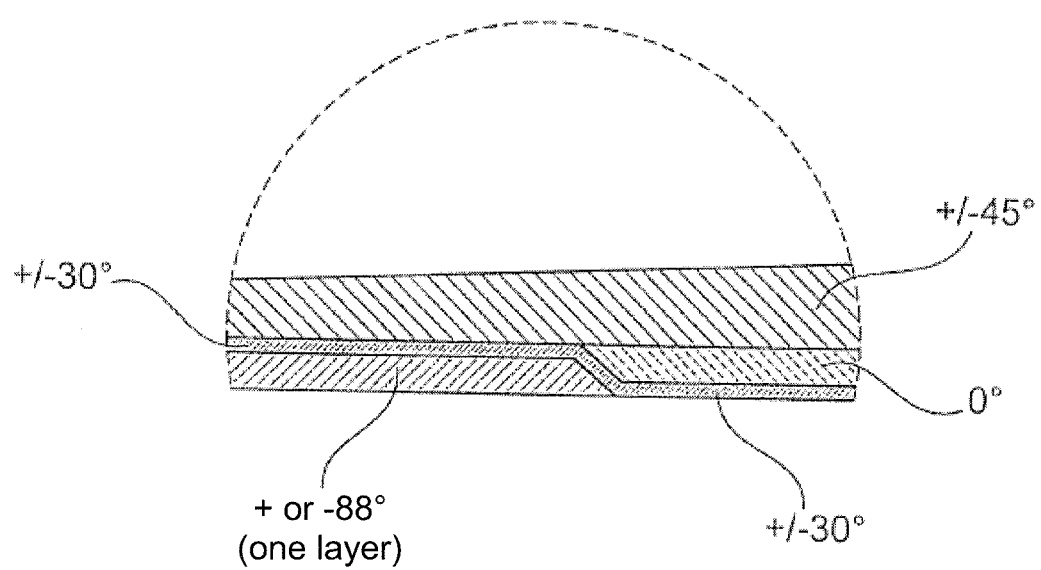
FIG. 21 shows a detail view in accordance with FIG. 20.

FIGS. 20 and 22 show sectional views parallel to the center axis 30 of the shaft 14, 16, illustrating the arrangements of the individual layers of the carbon fibers and their angular alignment relative to the center axis 30. FIG. 21 shows a detail view of FIG. 20. FIG. 23 shows the notation of orientation of fibers as shown in FIGS. 20-22.

LIST OF REFERENCE NUMERALS

1 Engine axis
2 Gas-turbine engine/core engine
3 Air inlet
4 Fan
5 Intermediate-pressure compressor (compressor)
6 High-pressure compressor
7 Combustion chambers
8 High-pressure turbine
9 Intermediate-pressure turbine
10 Low-pressure turbine
11 Exhaust nozzle
12 Engine casing
13 Gear unit
14 Radial shaft
15 Gear unit
16 Shaft
17 Gear unit
18 Core
19 End area of core
20 Sinusoidal structure
21 Structured rod/round rod
22 Longitudinal axis
23 Filler rod
24 +/−45° layers 25 +/−30° layers
26 Resin injection mould
27 End area of shaft 14, 16
28 Tubular center part
29 Load-input end piece
30 Center axis of shaft
31 Toothing
32 Zero layers
33 Centric recess
34 Radial duct
35 Positioning aid
36 Cable tie
37 Tied areas
38 Pressing tool
39 Pressing elements
40 Positioning aid
41 Joining device

What is claimed is:

1. A shaft of a turbine engine comprising:
    a center part, and
    load-input end pieces,
    wherein the center part includes a conical tube made of a carbon fiber composite material,
    wherein the load-input end pieces are made of a metallic material and connected to the center part via a positive sinusoidal structure including axially extending concave areas positioned on the load-input end pieces;
    the center part including end areas formed to at least partially fill the concave areas of the load-input end pieces, resulting in axially extending corresponding concave areas on outer peripheries of the end areas;
    a plurality of filler rods of carbon material positioned one each in the corresponding concave areas on the outer peripheries of the end areas, each of the plurality of filler rods having an elongated body having a radially inner side shaped to match a shape of the corresponding concave areas and a radially outer side shaped such that the plurality of filler rods together form a generally cylindrical outer shape when the plurality of filler rods are axially positioned in the respective axially extending corresponding concave areas;
    a further layer of carbon fiber composite material applied over the end areas with filler rods.

2. The shaft in accordance with claim 1, wherein the center part includes layers of flat and splayed carbon fiber strips arranged at an angle of +/−45° to a center axis of the center part.

3. The shaft in accordance with claim 2, wherein the center part includes on the +/−45° layers of flat and splayed carbon fiber strips at least over part of its axial length at least one layer of splayed carbon fiber strips arranged parallel to a center axis of the center part.

4. The shaft in accordance with claim 2, wherein the center part includes at least one layer of carbon fiber strips arranged at +/−88° positioned to radially adjoin at least a portion of at least one of the load-input end pieces.

5. The shaft in accordance with claim 1, wherein the end areas of the center part have a sinusoidal sectional shape.

6. The shaft in accordance with claim 1, wherein at least one of the load-input end pieces includes a sinusoidal outer contour over part of its length.

7. The shaft in accordance with claim 6, wherein the sinusoidal outer contour includes convex areas.

8. The shaft in accordance with claim 1, wherein at least one of the load-input end pieces includes a centric recess which merges into at least one radial duct.

9. The shaft in accordance with claim 1, wherein the carbon fiber composite material includes carbon fibers impregnated with resin and cured.

* * * * *